Figure 1:
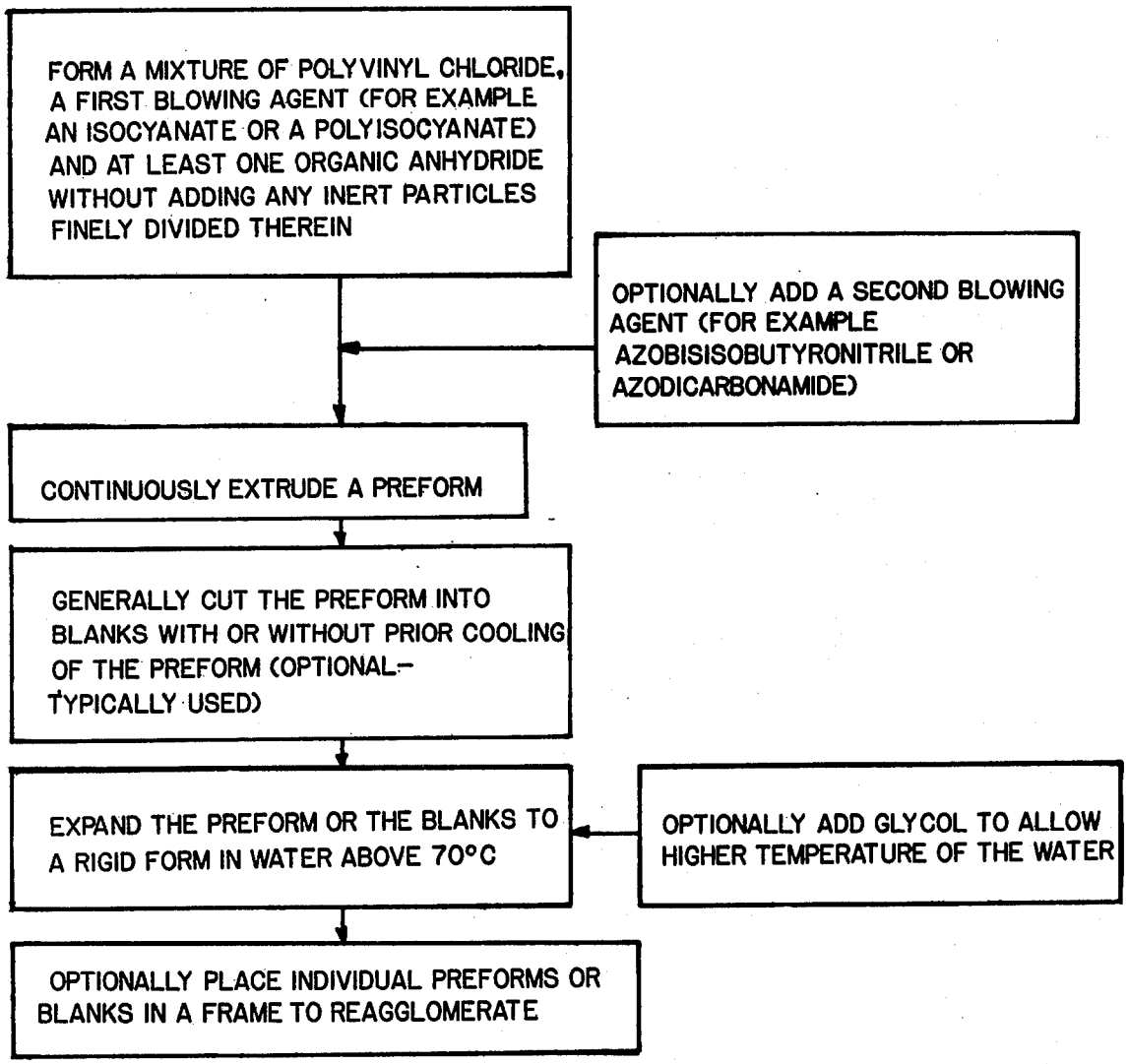

United States Patent [19]

Lemoine et al.

[11] Patent Number: 4,469,819

[45] Date of Patent: Sep. 4, 1984

[54] PROCESS FOR THE PRODUCTION OF OBJECTS MADE OF A RIGID EXPANDED MATERIAL BASED ON POLYVINYL CHLORIDE, OBJECTS OBTAINED BY SAID PROCESS, AND USES THEREFOR

[75] Inventors: Guy Lemoine; Robert Lucas, both of Le Havre; Michel Vernon, Trilport, all of France

[73] Assignee: Compagnie Francaise de Raffinage, Paris, France

[21] Appl. No.: 417,787

[22] Filed: Sep. 13, 1982

[30] Foreign Application Priority Data

Sep. 14, 1981 [FR] France .................................. 81 17344

[51] Int. Cl.$^3$ ............................................. B29D 27/00
[52] U.S. Cl. ................................. 521/79; 47/DIG. 10; 264/54; 264/DIG. 3; 521/82; 521/; 521/94; 521/134
[58] Field of Search ........................... 264/54, DIG. 3; 47/DIG. 10; 521/79, 82, 94, 134

[56] References Cited

U.S. PATENT DOCUMENTS

| | | | |
|---|---|---|---|
| 2,652,379 | 9/1953 | Hedrick et al. | 47/DIG. 10 |
| 3,033,806 | 5/1962 | Spencer | 264/53 |
| 3,200,089 | 8/1965 | Landler et al. | 264/DIG. 3 |
| 3,256,217 | 6/1966 | Landler et al. | 264/54 X |
| 3,283,043 | 11/1966 | Landler et al. | 264/54 |
| 3,713,253 | 1/1973 | Urban | 47/DIG. 10 |
| 4,293,511 | 10/1981 | Vernon | 249/126 X |
| 4,333,780 | 6/1982 | Allada | 264/54 X |

FOREIGN PATENT DOCUMENTS 1313237 11/1962 France .
2408451 6/1979 France .

Primary Examiner—Philip E. Anderson
Attorney, Agent, or Firm—Curtis, Morris & Safford

[57] ABSTRACT

A continuous process for making rigid PVC foam objects by extruding a preform from an initial PVC mixture, optionally cutting the preform into blanks, and expanding the preform or the blanks in water heated to a temperature above 70° C. The initial mixture contains polyvinyl chloride, at least a first blowing agent capable of generating a gas, for example an isocyanate or a polyisocyanate, and at least one organic anhydride (and does not contain any added inert particles finely divided therein). The initial mixture may also contain less than one weight percent of a second blowing agent, for example azobisisobutyronitrile or azodicarbonamide. The objects produced possess heat- and sound-insulating properties.

6 Claims, 1 Drawing Figure

PROCESS FOR THE PRODUCTION OF OBJECTS MADE OF A RIGID EXPANDED MATERIAL BASED ON POLYVINYL CHLORIDE, OBJECTS OBTAINED BY SAID PROCESS, AND USES THEREFOR

The present invention relates to a process for the production of objects made of a rigid expanded material based on polyvinyl chloride. It further relates to the objects produced by said process and to various uses for said objects.

The preparation of rigid expanded polyvinyl chloride is a well-known operation which has been described many times in the literature and is the subject matter of many patents, for example, French Pat. No. 2,408,451.

Industrially, it is carried out discontinuously by a process comprising three steps:

(1) In the first process step, a mixture is prepared from at least three components:

A first component, which is the principal component on a weight-percent basis, and which is polyvinyl chloride itself;

at least one second component which is capable of liberating a gas, and which may be azobisisobutyronitrile and/or azodicarbonamide, for example, the gas liberated being, in this case, nitrogen; and at least one third component which is capable of liberating a gas when contacted with water, and which may be an isocyanate or a polyisocyanate, for example, the gas liberated being, in this case, carbon dioxide.

As a rule, an organic anhydride such as phthalic anhydride is introduced into the mixture as a fourth component.

Other components, and particularly stabilizers, may be incorporated in the mixture during this first step.

It should be noted that the presence of at least one liquid compound in the mixture is desirable for the purpose of obtaining a homogeneous mixture. Said liquid compound may be the isocyanate and/or the polyisocyanate, for example.

(2) In the second process step, the plastisol is molded at a temperature ranging from 150° to 200° C., for example, and preferably from 160° to 180° C., and at a pressure ranging from 5 to 500 bars, and preferably from 100 to 300 bars.

This second step yields a soft thermoplastic product containing tiny cells which are probably due to thermal decomposition of one or more components of the plastisol.

The product obtained at the end of this second step is commonly called "embryo".

(3) In the third step, the "embryo" is expanded by being contacted with water, in the liquid phase or in the vapor phase, at a pressure which is preferably close to atmospheric pressure and at a temperature which preferably ranges from about 70° to 100° C.

If a suitable component such as glycol is added to the water, expansion may be effected at a higher temperature.

This third step, expansion, may be carried out either in an expansion frame whose dimensions are chosen on the basis of the size which the end product is to have, or by allowing the "embryo" to expand freely.

The reactions which take place during this third step have not been precisely defined. It is generally believed that the third component, the isocyanate or the polyisocyanate, reacts with the water and/or with the fourth component, if there is one.

Thus a rigid expanded structure is obtained due to the gases evolved in the various reactions.

It will be apparent from this description that the industrial practice of this process as a batch process is rather complicated. Still, it is perfectly well suited to the manufacture of expanded polyvinyl chloride slabs.

Nevertheless, it has been sought to develop a continuous process for the production of objects made of a rigid expanded material based on polyvinyl chloride.

Thus, French Pat. No. 1,313,237 relates to a process for the continuous production of cellular products based on polyvinyl chloride and polyisocyanates which is characterized by the fact that during a first step there is extruded, in a continuous manner, a product having the embryonic form of the end product in a dense, cell-free state. The generation of cells takes place during the second step, by the reaction of water or steam with the polyisocyanate contained in the mixture. According to this patent, to secure a uniform cell structure a finely divided inert substance is incorporated in place of azobisisobutyronitrile in the mixture to be extruded. These inert particles promote the uniform formation of cells as the extruded product is contacted with water. However, it has not been possible to obtain expanded polyvinyl chloride slabs with a regular cell structure by this process.

The applicants have found that it is by no means necessary to use such inert particles in a continuous extrusion process to obtain cellular products.

The object of the present invention thus is to develop a continuous process for the production of objects made of a rigid expanded material based on polyvinyl chloride.

Thus the invention relates to a process for the production of objects made of a rigid expanded material based on polyvinyl chloride which is characterized in that it comprises the following successive steps:

(a) Extrusion of a preform from a mixture comprising, to the exclusion of any divided inert particles:

Polyvinyl chloride;

at least a first blowing agent reactant capable of generating a gas, when contacted with water selected from the group formed by the isocyanates and the polyisocyanates; and at least one organic anhydride.

(b) Optional cutting up of the preform to give blanks of the object to be produced.

(c) Expansion of said blanks in water heated to a temperature above 70° C.

FIG. 1 is a flow diagram of the continuous extrusion process for forming the rigid expanded polyvinyl chloride product.

In accordance with the invention, the initial extruded mixture may further contain at least a second blowing agent selected from the group formed by azobisisobutyronitrile and azodicarbonamide.

Said agent or agents is or are preferably added to the initial mixture in an amount representing preferably not more than 1 weight percent of said mixture.

Above that percentage, the subsequent expansion of the preform or of the blanks obtained from the preform will result in imperfectly expanded objects.

The polyvinyl chloride used in the process of the invention may, in particular, be a polyvinyl chloride having a viscosity index, as measured in conformity with French standard NFT 51-013, ranging in particular from 80 to 180.

The initial mixture may contain, in particular, from 20 to 60 weight percent polyvinyl chloride, preferably of a porous structure, obtained by a bulk-polymerization process.

The first blowing agent capable of generating a gas may be, in particular, toluene-2,4-diisocyanate (which may contain toluene-2,6-diisocyanate) or diphenylmethane-4,4'-diisocyanate, optionally in mixture. The initial mixture may contain, in particular, from 20 to 40 weight percent of this blowing agent.

The initial mixture further contains an organic anhydride such as phthalic anhydride, maleic anhydride or succinic anhydride. It may contain, in particular, between 0 and 30 weight percent of such anhydride.

It may further contain additives, for example, stabilizers such as lead salts, for example, dibasic lead phosphite and lead stearate, as well as pigments and dyes.

In the process in accordance with the invention, the preform may be extruded in any desired form, for example, as a strand, sheet, tube, etc.

In general, this preform is cut after optional cooling. Cooling may be effected, for example, by passing the preform through cold water for a very short time to avoid expansion of the preform.

Expansion of the preform or of the blanks obtained from it is effected by contacting them with water, in the liquid phase or in the vapor phase, at a pressure which preferably is close to atmospheric pressure and at a temperature preferably ranging from about 70° to 100° C.

If a suitable component such as glycol is added to the water, the expansion may be effected at a higher temperature.

Depending on the configuration of the preform, cutting may lend itself to the production of blanks from which objects of very different shapes may be obtained after expansion.

When the preform is a strand, expanded polyvinyl chloride granules having substantially the shape of a bead may thus be obtained.

These objects, for example, beads, may be reagglomerated for their ultimate use, for example, by being contacted with a liquid compound such as cyclohexanone or tetrahydrofuran, or with the aid of adhesives.

They may also be reagglomerated upon the expansion of the blanks by being contacted with water while placed in a frame of appropriate shape.

The objects prepared by the process in accordance with the invention may be used in various applications.

In particular, they may serve as sound or heat insulation in buildings and as heat insulation for tanks such as liquefied-gas tanks.

Their buoyancy makes them suitable for use as floats in fishery, for example, or as antipollution barriers.

Moreover, since these are light products, they may be used to loosen soil in agriculture, provided that the objects are of small size.

The examples which follow, which are not limitative, relate to the preparation of expanded polyvinyl chloride beads by the process of the invention and to thermal conductivity and compressive strength tests conducted with these beads for comparison with products used at present for heat insulation.

EXAMPLE 1

This example relates to the production of expanded polyvinyl chloride beads by the process of the invention.

First a mixture MO, whose composition is given in Table 1 which follows, was prepared in a heated mixture at a temperature of 60° C.

TABLE 1

| No. | Component | Weight percent |
|---|---|---|
| 1 | Polyvinyl chloride (a) | 48 |
| 2 | Toluene diisocyanate (b) | 13.5 |
|   | Diphenylmethane-4,4'-diisocyanate | 10.5 |
| 3 | Phthalic anhydride | 26 |
| 4 | Barium and cadmium stabilizer | 0.5 |
| 5 | Epoxidized soybean oil | 1.5 |

(a) Polyvinyl chloride in powder form.
Viscosity index: 130 (in conformity with French standard AFNOR NFT 51-013).
Apparent density: 568 grams/liter.
(b) Mixture of 80% toluene-2,4-diisocyanate and 20% toluene-2,6-diisocyanate.

First the solid ingredients (1,3, and 4) were mixed, and then the liquid ingredients (2 and 5) were added gradually.

Thus the mixture MO was obtained.

From mixture MO, various mixtures MA and MB were prepared by adding to MO different percentages of a second blowing agent, namely, azobisisobutyronitrile and azodicarbonamide.

The composition of these mixtures is given in Table 2 which follows, wherein the parts by weight of blowing agent added per 100 parts by weight of MO are specified.

TABLE 2

| Mixture | Parts by weight of blowing agent per 100 parts by weight of MO | Blowing agent |
|---|---|---|
| MA 1 | 0.05 | Azobisisobutyronitrile |
| MA 2 | 0.1 | " |
| MA 3 | 0.2 | " |
| MA 4 | 0.5 | " |
| MA 5 | 1 | " |
| MB 1 | 0.05 | Azodicarbonamide |
| MB 2 | 0.1 | " |
| MB 3 | 0.2 | " |
| MB 4 | 0.5 | " |
| MB 5 | 1 | " |

The various mixtures so obtained were then extruded at 100° C. through a die of a cylindrical cross section 2 mm in diameter.

The strands so obtained were cooled in water at 20° C. for a few seconds, then chopped up in a granulator.

The granules obtained were expanded for 10 minutes in water heated to 97° C.

Thus, expanded polyvinyl chloride beads whose apparent densities are given in Table 3 below were obtained.

TABLE 3

| Initial mixture | Apparent density, kg/m³ |
|---|---|
| MO | 48 |
| MA 1 | 40 |
| MA 2 | 37 |
| MA 3 | 50 |
| MA 4 | 100 |
| MA 5 | No expansion |

TABLE 3-continued

| Initial mixture | Apparent density, kg/m$^3$ |
| --- | --- |
| MB 1 | 44 |
| MB 2 | 36 |
| MB 3 | 38 |
| MB 4 | 58 |
| MB 5 | No expansion |

It will be noted that there was no expansion in the case of the mixtures containing 1 weight percent of the second blowing agent.

EXAMPLE 2

This example relates to thermal conductivity and compressive strength tests performed with rigid expanded polyvinyl chloride beads produced in accordance with Example 1 as well as with conventional insulating products.

The thermal conductivity measurements were made in conformity with French standard AFNOR T 56-124.

The compressive strength measurements were made in conformity with French standard AFNOR T 56-101.

The results are presented in Table 4 which follows.

TABLE 4

| | Beads obtained from | | | Perlite | Vermiculite H | Vermiculite M |
| --- | --- | --- | --- | --- | --- | --- |
| | MO | MA 2 | MB 2 | | | |
| Apparent density, kg/m$^3$ | 48 | 37 | 36 | 80 | 100 | 107 |
| Coefficient of thermal conductivity, watt/m K | 0.0237 | 0.0261 | 0.0257 | 0.0296 | 0.0431 | 0.0469 |
| Compressive strength (pressure, in kg/cm$^2$, required to obtain 25% deformation) | 2.410 | Not measured | | 0.794 | 0.448 | 0.512 |

It is apparent that the beads obtained by the process of the invention have a low coefficient of thermal conductivity and therefore are good insulators, and that they have good compressive strength.

We claim:

1. A process for the production of an object made of a rigid expanded material based on polyvinyl chloride comprising the following successive steps:
   (a) Extruding a preform from an initial mixture prepared without the addition of any inert finely divided particles therein, said mixture comprising:
       polyvinyl chloride,
       at least a first blowing agent reactant capable of generating a gas when contacted with water, selected from the group consisting of the isocyanates and the polyisocyanates, and
       at least one organic anhydride; and
   (b) Expanding said preform in water heated to a temperature above 70° C.

2. A process according to claim 1, wherein the polyvinyl chloride is a polyvinyl chloride having a porous structure, obtained by a bulk-polymerization process.

3. A process for the production of an object made of a rigid expanded material based on polyvinyl chloride comprising the following successive steps:
   (a) Extruding a preform from an initial mixture prepared without the addition of any inert finely divided particles therein, said mixture comprising:
       polyvinyl chloride,
       at least a first blowing agent reactant capable of generating a gas when contacted with water, selected from the group consisting of the isocyanates and the polyisocyanates, and
       at least one organic anhydride;
   (b) Cutting said preform into blanks; and
   (c) Expanding said blanks in water heated to a temperature above 70° C.

4. A process according to claim 3, wherein the preform is cooled prior to the cutting step.

5. A process according to claims 1, 3, 4 or 2, wherein the initial mixture contains less than 1 weight percent of a second blowing agent selected from the group consisting of azobisisobutyronitrile and azodicarbonamide.

6. An object produced according to the process of claim 1.

* * * * *